United States Patent Office 2,997,843
Patented Aug. 29, 1961

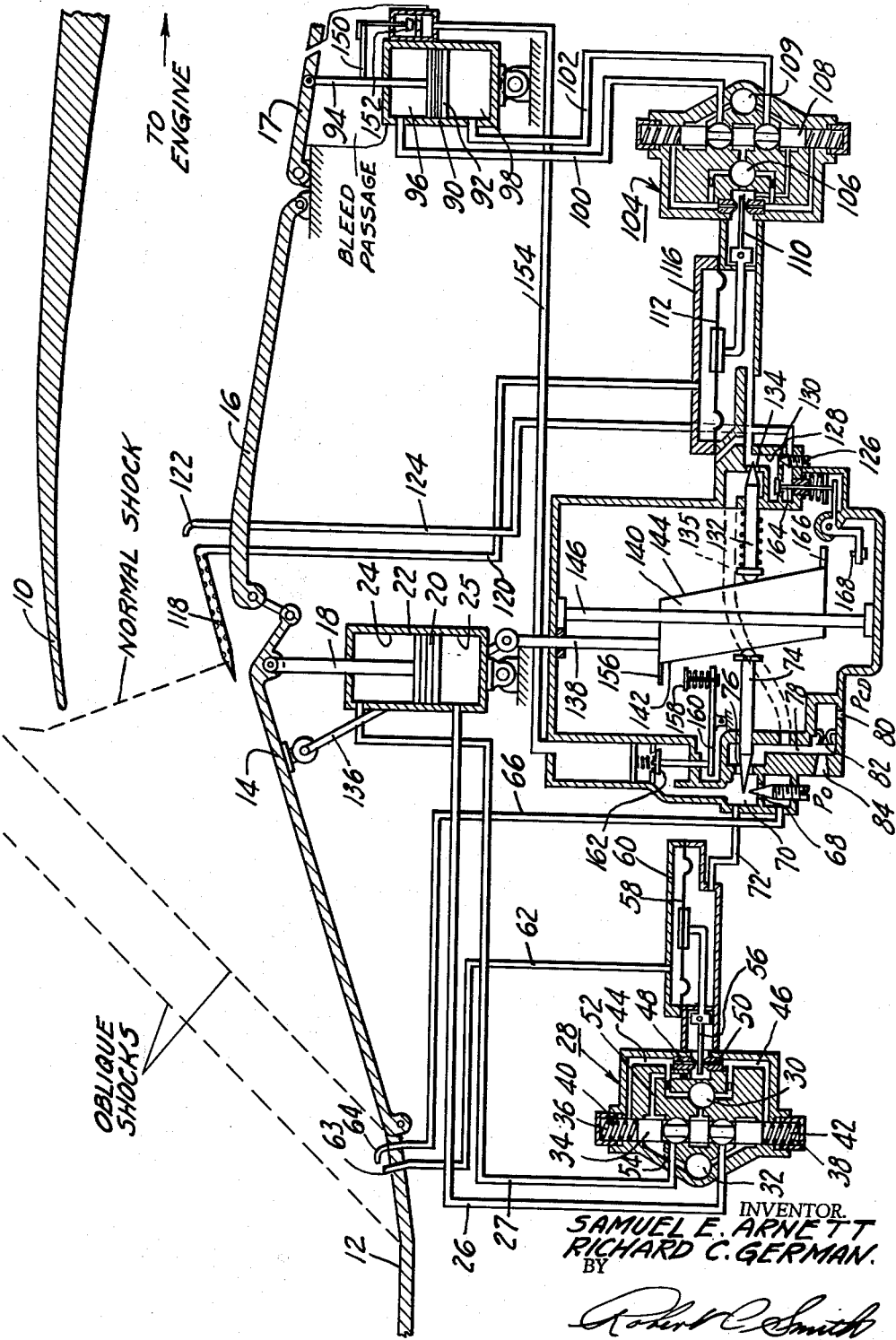

2,997,843
INLET CONTROL SYSTEM FOR SUPERSONIC AIRCRAFT
Samuel E. Arnett and Richard C. German, South Bend, Ind., assignors to The Bendix Corporation, a corporation of Delaware
Filed Apr. 23, 1958, Ser. No. 730,384
6 Claims. (Cl. 60—35.6)

The present invention concerns means for varying the effective area of the air inlet passage for an engine used in supersonic aircraft and more particularly to an inlet area varying device designed to assure substantially the maximum pressure recovery possible to the engine.

In the design of supersonic aircraft it has been observed that the configuration of the air inlet ports to the engine may be somewhat critical as regards the proper delivery of air to the engine. It has been observed that a given inlet configuration may prove entirely satisfactory over a certain range and then cause an effective starvation of the engine over a somewhat different speed or Mach number range. It has been determined that it is highly desirable if the maximum pressure recovery can be obtained at the inlet to the aircraft in order to assure that the weight of air available for the engine is at a maximum for the available conditions and the area should be maintained such that the available volume of air will equal or exceed the engine requirements over substantially all of the aircraft operating range. It has been determined that the maximum possible pressure recovery is achieved from an inlet when the oblique shock surfaces are positioned to achieve flow deceleration with minimum losses in pressure and when a shock normal to the direction of air flow into the engine occurs at the lowest possible Mach number behind the oblique shock. This deceleration with low losses is attained when the variable oblique shock surfaces are positioned uniquely as a function of the Mach number approaching the surface. The area variation working in combination with the maximum pressure recovery method may, over a portion of the operating range, result in providing a greater quantity of air to the engine than can be assimilated and means are, therefore, provided for by-passing the surplus air around the engine as required. A method of by-pass control has been selected to indirectly position the normal shock by control of the Mach number behind the normal shock. The reference Mach number for control is scheduled by the variable wedge angle. Since the wedge schedule is based on the flow Mach number approaching the wedge, the Mach number after the oblique shock and after the normal shock are unique with wedge position. The Mach number behind the normal shock can therefore be scheduled with wedge position to maintain the shock at a desired position. It is, therefore, an object of the present invention to obtain the maximum pressure recovery possible within the limitations of the inlet designed.

It is another object to maintain an inlet and engine air flow match at the highest possible pressure recovery.

It is another object of the present invention to provide an inlet configuration in which a low inlet drag is maintained.

It is another object of the present invention to provide an inlet area control which will function satisfactorily for all Mach numbers where no shocks exist thereby facilitating the scheduling of flow area in the subsonic flight region.

It is another object to provide air inlet control which is sufficiently flexible to be useful for both fuselage and wing pod inlets.

It is a further object of the present invention to provide an air inlet control system in which the components and the overall system are such that a high degree of reliability and accuracy may be provided.

It is a further object of the present invention to provide a unique type of Mach number controlled servo system.

Other objects and advantages will become apparent from the following specification taken in connection with the drawing in which is shown a schematic diagram of our air inlet control system in connection with an inlet device incorporating a variable wedge and by-pass structure.

Referring to the drawing, the forward portion of an engine fuselage or nacelle is shown at numeral 10 and this member cooperates with a stationary wedge member 12 and a movable wedge member 14 to define the effective area of the air inlet passageway to the engine (not shown). Cooperating with member 14 to establish the effective inlet configuration is a movable member 16 positioned within the interior of member 10. Positioned still further within the interior of the member 10 is a by-pass gate or valve 17 which permits air flow to be diverted from the engine. At supersonic speeds there will be developed along the surfaces of members 12 and 14 one or more oblique shock waves as illustrated. There will also be developed in the region of the air inlet a shock wave normal to the direction of air flow into the inlet.

As stated above it has been determined that maximum possible pressure recovery is achieved when the oblique shock surfaces are positioned to achieve flow deceleration with minimum losses in pressure and when the normal shock occurs at the lowest possible Mach number behind the oblique shock. This requires that the variable oblique shock surface be positioned uniquely as a function of the Mach number approaching the surface. To this end the wedge members 14 and 16 are positioned as a desired function of Mach number by means of a Mach number controlled servomotor system. Variable wedge member 14 is connected to a shaft 18 driven by a piston 20 in a cylinder 22. Movement of the piston 20 in a vertical direction is effected by means of controlling the flow of high pressure hydraulic fluid to either of chambers 24 or 25 on opposite sides of piston 20. A servo valve for controlling the flow of high pressure fluid to the piston 20 through conduits 26 and 27 is shown generally at numeral 28 and includes an inlet high pressure port 30 and a return low pressure port 32. Also positioned within assembly 28 is a spool valve 34 normally held in a centered position by means of springs 36 and 38 in chambers 40 and 42 respectively. Each of these chambers is in communication with the high pressure fluid port 30 by means of conduits 44 and 46 respectively. Also communicating with inlet port 30 are a pair of orifices 48 and 50 which normally communicate with return conduit 32 by means of conduits 52 and 54. Control of the flow from these orifices is effected by means of a flapper valve 56 connected to a diaphragm member 58 positioned within a housing 60. The top side of diaphragm 58 is in communication through a conduit 62 with a static pressure sensor 63 positioned at the stationary wedge member 12. The bottom side of diaphragm 58 is in communication with a total pressure (Pitot tube pressure) probe 64 which communicates through a conduit 66 across a manually adjustable orifice 68, a chamber 70, and a conduit 72. The effective pressure level in chamber 70 and hence the pressure level acting on the bottom side of diaphragm 58 is determined not only by the pressure valve sensed by pick-up 64 but also by the effective position of a valve member 74 which controls the effective area of an orifice 76. It will thus be observed that the pressure acting on the bottom side of diaphragm 58 is not the total pressure sensed at pick-up 64 but is a modulated pressure varying with the effective position of valve 74. It therefore acts as a variable reference pressure. In order to assure sonic flow across orifice 76 and into a conduit 78, an ejector mechanism has been provided in which air at very high pressure such as that taken from the discharge side of the engine compressor is supplied to a port 80 through an orifice 82 and out of an ejector port 84.

The by-pass gate 17 is operated by means of an hydraulic motor 90 containing a piston 92 having attached thereto a shaft 94 connected to gate member 17. The effective position of piston 92 is controlled through control of the fluid pressures acting in chambers 96 and 98 on each side of piston 92. These chambers communicate through conduits 100 and 102 respectively with a servo valve 104 essentially identical to servo valve 28. In this servo valve fluid is supplied from a high pressure port 106 to one side or the other of a spool valve member 108 and is returned to a port 109. This high pressure is controlled by means of a flapper valve 110 which has its effective position established by means of a diaphragm 112 acting in a housing 116. Movement of the flapper valve 110 toward one or the other of its adjacent orifices results in a pressure increase causing spool valve 108 to move up or down and causing high pressure fluid to flow through either conduit 100 or 102 to either chamber 96 or chamber 98. The top side of diaphragm 112 is in communication with the static pressure sensed at the throat of the inlet by means of a pressure probe 118 which communicates therewith through a conduit 120. The total pressure at the throat of the inlet is also sensed by means of a pressure pick-up 122 which communicates through a conduit 124 with a manually adjustable valve 126 in orifice 128 and a chamber 130 communicating with the lower side of diaphragm 112. The effective pressure level in chamber 130 is controlled by means of a valve member 132 which controls the effective area of an orifice 134. Sonic flow across valve 132 is assured by means of a conduit 135 which connects with conduit 78.

Movement of wedge control members 14 and 16 in response to movement of piston 20 results in the corresponding movement of a pair of links 136 and 138 resulting in a vertical movement of a member 140 containing a cam surface 142 which controls the position of valve 74 and another cam surface 144 which controls the position of valve 132. This member travels vertically along a post 146.

At some angles of attack the system shown may limit air flow to an extent greater than that desired. This is overcome by biasing the schedule with the by-pass bleed position. As the by-pass member 17 is closed, an arm 150 attached to shaft 94 causes a valve member 152 to be opened thereby allowing the modulated pressure in chamber 70 to be exhausted through a conduit 154, causing the wedge angle to decrease and resulting in an increase in the inlet air flow. When the wedge approaches its lowest angle of position, an abutment member 156 attached to cam 140 strikes the corresponding abutment member 158 attached to a lever 160 which results in the closing of a valve 162 thereby blocking the discharge of pressure from chamber 70 through conduit 154. A valve 164 in parallel with valve 126 is held in an open position by an abutment 166 on cam member 140 which contacts abutment member 168 during the time the wedge members 14 and 16 are in the most open position. When valve 164 is opened the comparatively high pressure level sensed at probe 122 is communicated with the lower side of diaphragm 112 with very little pressure reduction. As a result the by-pass 17 is maintained closed until flight conditions exist where the wedge, and hence the cam member 144, begin to move. At high Mach numbers where movement of the wedge ceases, the perforated static probe 118 becomes effective. The normal shock is well defined in this range and a shock positioning control is in operation. The static pressure sensed downstream of the shock wave is comparatively high with respect to the pressure sensed upstream. As the normal shock moves along the static probe, part of the probe will be vented to the static pressure ahead of the normal shock. The probe averages the pressures on each side of the shock wave on the basis of their relative effective areas. Thus a false Mach number signal is created and the control modulates the by-pass to maintain the shock at a given position on the probe.

Operation of this system in the speed range up to a given value essentially involves maintaining the inlet area at its maximum opening and the by-pass member closed. At some velocity of the aircraft which may be approximately Mach 1.7 the static and total pressure pick-up on the stationary wedge member 12 will communicate a sufficient pressure differential to the diaphragm 58 to cause the flapper valve 56 to move toward orifice 50 resulting in a fluid pressure build-up in chamber 42 which, acting in conjunction with the force exerted by spring 38, causes the spool valve 34 to move in an upward direction. This results in communication of high pressure hydraulic fluid from inlet port 30 to chamber 25 acting on the bottom side of piston 20. This will cause the piston to move in an upward direction reducing the effective area of the inlet, and at the same time, causing the movement back through links 136 and 138 of the member 140 and the cam surface 142. The valve 74, which rides against cam 142 is withdrawn from the orifice 78 and the pressure level acting on the bottom side of diaphragm 58 is reduced until it equals the pressure acting on the top side of said diaphragm. When equilibrium is obtained the wedge is stabilized at a new position.

Movement of the member 140 in response to movement of the wedge also results in varying of the effective area of orifice 134 and therefore the modulated pressure acting on the bottom side of diaphragm 112. This results in an effective change in the Mach number reference which controls the operation of the by-pass member 17. This arrangement proves satisfactory since the wedge schedule is based on the flow Mach number approaching the wedge and therefore the Mach number after the oblique shock and after the normal shock are both unique with the wedge position. Changes in Mach number at or behind the normal shock are therefore sensed by pressure sensing devices 118 and 122 which, acting through diaphragm 112 and servo valve 104, control the effective pressure level acting against piston 92 and thereby the amount of air by-passed around the engine.

As set forth above, the members 14 and 16 are moved to vary the wedge angle to obtain maximum pressure recovery for the given Mach number approaching the particular wedge. When the wedge 14 is moved to a position which allows minimum or substantially minimum area as at high Mach numbers, the air may tend to, in effect, pile up in the inlet passage and force the normal shock wave outside of the inlet causing it to be spilled around the outside of member 10. This is undesirable for two reasons: first, the movement of the normal shock forward to the point where the air associated with the shock wave is caused to spill around the outside of member 10 causes considerably more drag on the airplane than if the surplus air is directed through the aircraft by means of a bleed passage such as that controlled by member 17; secondly, it is desired to maintain maximum pressure recovery and maximum density of air to the engine and this is accomplished by causing the bleed passage 17 to open and permit surplus air to flow through the passage while containing the normal shock within the interior of member 10. At relatively low speeds, the angle of the wedge is simply controlled by means of Mach number. The wedge is moved as desired to control the pressure recovery to the air supplied to the associated engine and the bleed passage door 17 will not normally be operative. At comparatively high speeds the effective position of the normal shock wave which is sensed along the length of probe 118 becomes a significant factor and the sensor 104 picks up a second function and acts not only as a Mach number sensor but, in association with the probe 118, acts to position the door 17 to control the effective position of the normal shock wave to avoid the excessive drag referred to above and also to provide maximum pressure recovery in this regime of operation.

While only one embodiment is shown in and described herein it will be apparent to those skilled in the art that a number of modifications are possible within the scope of the invention. And while the above description is concerned with varying inlet area by means of a wedge structure it will be apparent that the system disclosed herein may be used with other types of structures such as an axially movable spike positioned in the center of the inlet.

We claim:

1. In a system for controlling the air inlet supply to an engine for a supersonic aircraft in which air flow deceleration occurs behind at least one oblique shock wave, means for securing maximum pressure recovery to said engine including a wedge-shaped member operable to vary the effective area of the air inlet passage, a passage for by-passing air around said engine and a gate for controlling flow to said passage, a first hydraulic motor connected to vary the position of said wedge, a second hydraulic motor connected to vary the position of said gate, hydraulic servo valve means connected to each of said hydraulic motors, first pressure responsive means for sensing static and total pressures of air flow at the approach to said wedge, second pressure responsive means for sensing static and total pressures of air flow measured in the region of a shock wave normal to said intake passage, first and second movable wall devices connected to said first and second pressure responsive means, respectively, wherein static pressure is connected to one side of each of said movable wall devices, first and second modulated pressure chambers connected to the other side of each of said first and second movable wall devices, respectively, a conduit connecting said first and second modulated pressure chambers to the total pressure sensed by said first and second pressure responsive means, a restriction in said conduit, a second conduit connecting each of said modulated pressure chambers with a low pressure source, a valve in each of said second conduits, a movable cam device having a cam surface in contact with each of said valves, means responsive to movement of said wedge for moving said cam device, and a flapper valve connected to each of said movable wall means for controlling the output of each of said hydraulic servo valve means.

2. In a system for controlling the air inlet supply to an engine for a supersonic aircraft in which air flow deceleration occurs behind at least one oblique shock wave, means for securing maximum pressure recovery to said engine including a member operable to vary the effective area of the air inlet passage, a passage for by-passing air around said engine and a gate for controlling flow to said passage, a first hydraulic motor connected to vary the position of said member, a second hydraulic motor connected to vary the position of said gate, hydraulic servo valve means connected to each of said hydraulic motors, first pressure responsive means for sensing static and total pressure of air flow at said member, second pressure responsive means for sensing static and total pressures of air flow measured downstream of said first pressure responsive means in the region of a shock wave normal to said intake passage, first and second movable wall devices connected to said first and second pressure responsive means, respectively, wherein static pressure is connected to one side of each of said movable wall devices, first and second modulated pressure chambers connected to the other side of each of said first and second movable wall devices, respectively, a conduit connecting said first and second modulated pressure chambers to the total pressure sensed by said first and second pressure responsive means, a restriction in said conduit, a second conduit connecting each of said modulated pressure chambers with a low pressure source, a valve in each of said second conduits, a movable cam device having a cam surface in contact with each of said valves, means responsive to movement of said member for moving said cam device, and a flapper valve connected to each of said movable wall means for controlling the output of each of said hydraulic servo valve means.

3. In a system for controlling the air inlet supply for a gas turbine engine, means for varying the effective area of the intake passage, means for by-passing air flow around said engine, first pressure responsive means for sensing static and total pressures of air flow in the region of said inlet area varying means, second pressure responsive means for sensing static and total pressures of air flow measured downstream of said first pressure responsive means in the region of a shock wave normal to said intake passage, a Mach number device responsive to each of said first and second pressure responsive means, servo valve means controlled by each of said Mach number devices, first and second servomotors controlled by each of said servo valve means and connected to said inlet area varying means and said engine air by-pass means, respectively, and means connected to said inlet area varying means and to said Mach number devices for varying one of said first and second pressures sensed in each of said Mach number devices.

4. In a system for controlling the air inlet supply for an engine for an aircraft, means for varying the effective area of the intake passage, means for by-passing air flow around said engine, first pressure responsive means for sensing static and total pressures of air flow in the region of said inlet area varying means, second pressure responsive means for sensing static and total pressures of air flow measured downstream of said first pressure responsive means, a Mach number device responsive to each of said first and second pressure responsive means, servo valve means controlled by each of said Mach number devices, first and second servomotors controlled by each of said servo valve means and connected to said inlet area varying means and said engine air by-pass means, respectively, and means connected to said inlet area varying means and to said Mach number devices for varying one of said first and second pressures sensed in each of said Mach number devices.

5. In a system for controlling the air inlet supply to an engine for a supersonic aircraft in which air flow deceleration occurs downstream of at least one oblique shock wave, means for securing maximum pressure recovery in the air flow to said engine including means for varying the effective area of the intake passage, means for by-passing air flow around said engine, first pressure responsive means for sensing static and total pressures of air flow in the region of said inlet area varying means, second pressure responsive means for sensing static and total pressures of air flow measured downstream of said first pressure responsive means in the region of a shock wave normal to said intake passage, a Mach number device responsive to each of said first and second pressure responsive means, servo valve means controlled by each of said Mach number devices, first and second servomotors controlled by each of said servo valve means and connected to said inlet area varying means and said engine air by-pass means, respectively, and means connected to said inlet area varying means and to said Mach number devices for varying one of said first and second pressures sensed in each of said Mach number devices with changes in the position of said inlet area varying means.

6. In a system for controlling the air inlet supply for an engine, means for varying the effective area of the intake passage, first Mach number responsive means including means for sensing the air pressure in the region of said inlet area varying means, means responsive to the position of said inlet area varying means, comparison means for comparing the output of said Mach number sensing means with said position responsive means to control said area varying means, second Mach number responsive means downstream of said first Mach number responsive means including an elongated static pressure probe responsive to the average pressure sensed along its length in the region of a shock wave normal to said intake passage, means for by-passing air around said engine, and servomotor means responsive to said second Mach number device for controlling the position of said by-pass means to control the position of said shock wave relative to said elongated probe for maximum pressure recovery to said engine.

References Cited in the file of this patent

UNITED STATES PATENTS

| | | |
|---|---|---|
| 2,638,738 | Salter | May 19, 1953 |
| 2,775,231 | Silver | Dec. 25, 1956 |
| 2,804,084 | Greenland | Aug. 27, 1957 |
| 2,820,340 | Dolza | Jan. 21, 1958 |
| 2,840,322 | Griffith | June 24, 1958 |
| 2,870,601 | Demetriades | Jan. 27, 1959 |
| 2,886,010 | Hayos | May 12, 1959 |

FOREIGN PATENTS

| | | |
|---|---|---|
| 1,075,248 | France | Apr. 14, 1954 |

(Corresponding to British 777,570, June 27, 1957)

| | | |
|---|---|---|
| 736,003 | Great Britain | Aug. 31, 1955 |